May 13, 1958   G. E. LILLIE   2,834,160
GRINDING MACHINE

Filed May 9, 1955   2 Sheets-Sheet 1

May 13, 1958  G. E. LILLIE  2,834,160
GRINDING MACHINE

Filed May 9, 1955  2 Sheets-Sheet 2

# United States Patent Office 2,834,160
Patented May 13, 1958

2,834,160
GRINDING MACHINE

Gordon E. Lillie, Bellows Falls, Vt., assignor to Bryant Chucking Grinder Company, Springfield, Vt., a corporation of Vermont Application May 9, 1955, Serial No. 506,893

6 Claims. (Cl. 51—165)

This invention relates to means for controlling the stock removal from a workpiece in internal or external grinding machines or the like.

Several practical and useful systems of sizing devices for grinding and honing machines are known to the art. One such system, for example, is described in U. S. Patent No. 2,585,533, wherein a sensing element periodically enters the hole to be ground from the side opposite that where the tool enters. Such a method has certain limitations, however, particularly in the case of "blind" holes or where the workpiece otherwise has such configuration that the gauge cannot enter or be used in the described way. In such cases, another method, commonly called "diamond sizing," is resorted to. This latter method is described in, for example, U. S. Patent No. 2,429,830, and is dependent on the relative position between the tool and the workpiece for control of the grinding cycle. That is, when a predetermined amount of feed movement has taken place, a suitable stop actuates, for example, a limit switch and thereby terminates the grinding cycle and conditions the machine for the next phase of said cycle.

Dependent as this latter system is on the geometric relationship between machine elements, it is necessary to estimate and take in account the inevitable and present deflections of said elements, and this must be done for each job setup. Furthermore, during the time a machine is working, several additional factors may present themselves and affect the estimated deflections, such factors, for instance, being caused by variables in form of wear of the machine elements and the variable cutting characteristics of the tool. Although it is to a certain degree possible to make hand adjustments to correct for such errors, it would demand the continuous attention of an operator and so would be detrimental to the modern concept of an automatic machine.

According to the present invention, in order to overcome the above mentioned shortcomings of the system of "diamond sizing" as it is now used in external and internal grinding machines, I have devised novel means for terminating the machine operating cycle, such means being responsive to a predetermined condition of a machine system indicative of the desired size of the workpiece. Briefly, my invention includes novel means responsive to grinding tool pressures against the workpiece, which pressures may be used to control the machine cycle as by terminating it.

The invention is further characterized by the provision of means whereby adjustments for different conditions may be quickly and readily effected, and by both ruggedness and simplicity in construction and operation.

Further objects and features of the invention will appear from the following description and appended drawings of a preferred embodiment thereof, wherein.

Figure 1:
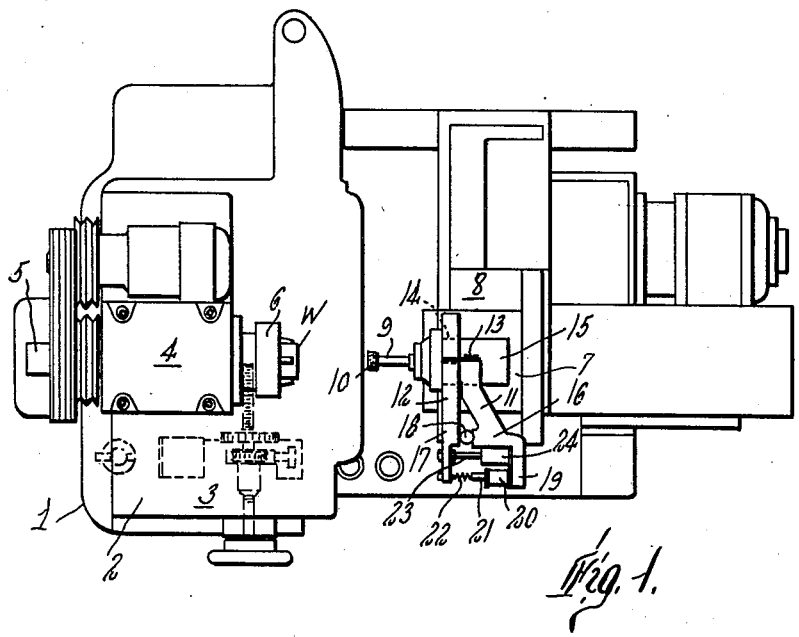
Fig. 1 is a general plan view of a internal grinding machine embodying the invention.

Referring to the drawings, therein is shown an internal grinding machine with a bed 1 having mounted on the left hand side thereof a workhead carriage 2 for transverse feed movement by means of a feed mechanism generally indicated at 3. On the carriage 2 is fastened a head stock 4 supporting a rotatable work spindle 5 having suitable holding means 6 for a workpiece "W." On the right hand of bed 1 is a slide in which a tool supporting carriage 7 is mounted for reciprocation longitudinally by any known means. This carriage supports a tool head generally indicated at 8 in which the rotatable tool spindle is journaled and driven, said spindle having a projecting portion 9 which in its outer extreme end carries a grinding wheel 10. Such internal grinding machines are generally well known in the art and will not herein be described in detail.

According to the present invention, a bracket 11 is bolted to carriage 7 and extends upwardly therefrom. To said bracket is attached a plate 12 by means of a hinge construction forming an axis allowing for a limited swinging movement in a horizontal plane only around a vertical axis, and restraining any other movements of said plate 12. The hinge means is preferably made up of two comparatively thin metallic reeds 13 extending in a vertical plane between bracket 11 and plate 12. This provides for rigid support of plate 12 in all directions but around a vertical axis, and is further of a "frictionless" design not susceptible to wear and adjunct possible lost motion.

The plate 12 has a hole 14 therein acting as pilot for the tool spindle housing 15, which is bolted by conventional means to a face of said plate so that the center of the rotative spindle in said housing crosses the aforesaid pivotal axis in perpendicular relationship thereto.

Extending outwardly from the bracket 11 is an arm portion 16 and plate 12 has a similar extended arm portion 17. Between said arms is interposed a hardened steel ball 18 maintained in position by any suitable means herein shown as opposed sockets in the faces of said arms. The portions of the arms contacted by the ball are preferably hardened.

Between the outer ends of said arms is arranged a solenoid, in such a manner that when said solenoid is energized, its armature 21 through the spring 22 exerts a force urging said arms together, since said spring has one end attached to the solenoid armature and the other end to the outer extreme of arm 17 and the solenoid coil and housing 20 is attached to arm 16. Thus, the pivoted system is held rigidly with the ball 18 preloaded to an amount established by said spring. Under such condition, the hardened steel ball acts as a compression spring and further pivotal movement of the system, caused by, for example, the normal grinding forces, is governed by the elastic properties of said steel ball.

Also interposed between the arms 16 and 17 is a transducer 24, which transducer is responsive to minute changes in position of the arms. Although a number of types of transducers may be employed, I prefer to use a strain gage of a type well known wherein the deformation of a wire changes its resistance to actuate a control circuit.

Figure 2:
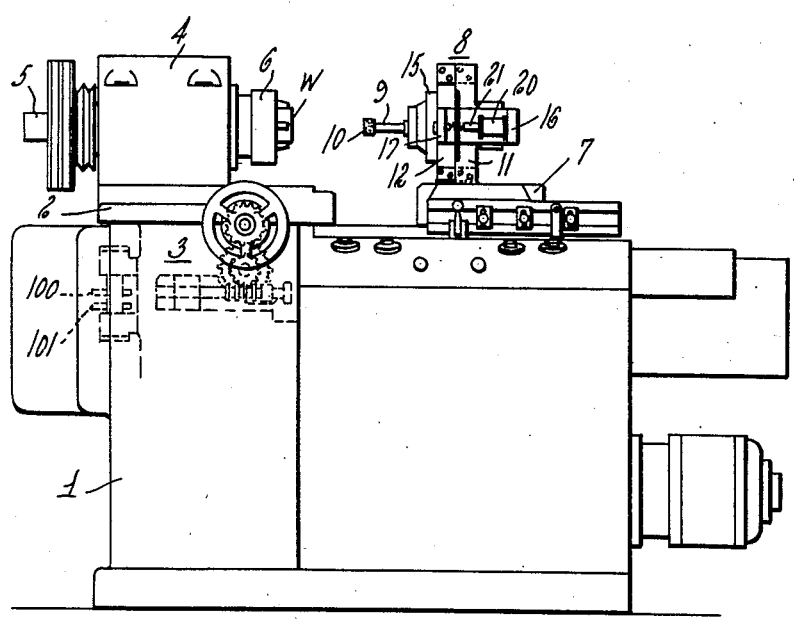
Fig. 2 is a general side elevational view of the machine of Fig. 1.
Figure 3:
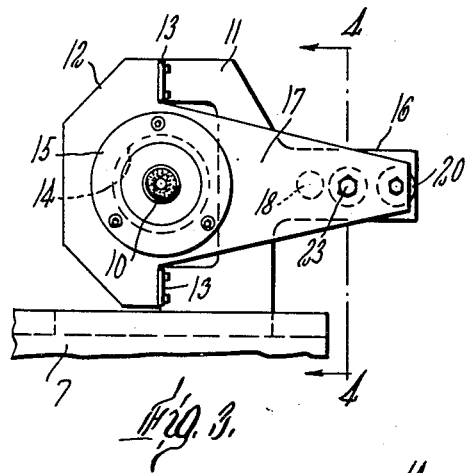
Fig. 3 is an enlarged end elevational view of a portion of the machine of Figs. 1 and 2.
Figure 4:
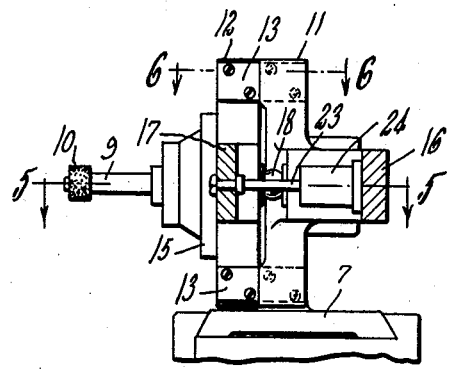
Fig. 4 is an enlarged cross-sectional side view of the portion of the machine as shown in Fig. 3 taken on the line 4—4 thereof.
Figure 5:
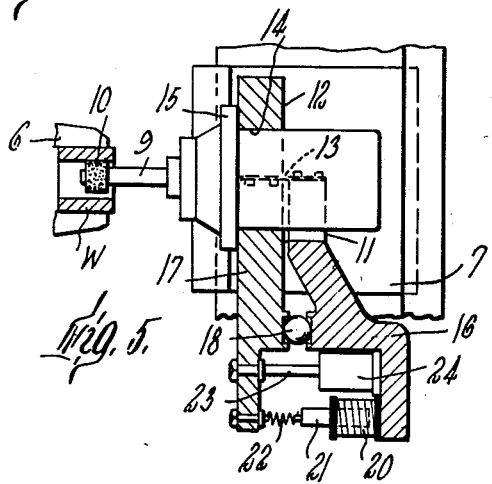
Fig. 5 is an enlarged cross-sectional plan view of the portion of the machine as shown in Figs. 3 and 4 taken on the line 5—5 of Fig. 4.
Figure 6:
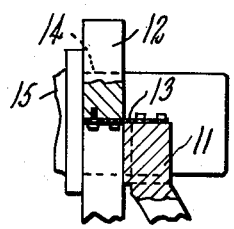
Fig. 6 is an enlarged cross-sectional plan view of the portion of the machine as shown in Figs. 3 and 4 taken on the line 6—6 of Fig. 4.
Figure 7:
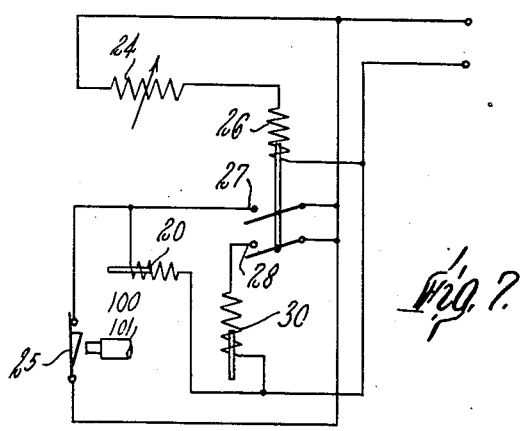
Fig. 7 is a simplified circuit diagram of a portion of the electrical control system of the machine of Figs. 1 and 2.

Considering now that the herein described device is applied to an internal grinding machine as shown, for example, in U. S. Patent No. 2,429,830, the stops 100 and 101 in Figures 1 and 5 of said patent are the same as those shown in Figure 2 hereof. In the referred to patent, the function of said stops was to terminate the grinding cycle when the feed mechanism had travelled a predetermined distance. Such termination involved reversal of the direction of feed movement, a separation of the tool and workpiece transversely, and also initiated a longitudinal separation of the tool and the workpiece.

In the present invention, the function of said stop is different in several respects. Herein, the grinding cycle is started and the tool is presented to the grinding zone both by a longitudinal motion of the tool carriage 7 wherein it reciprocates in a known way, and, at the same time, by a transverse feed motion. From the beginning of the cycle, the solenoid is energized and holds the pivotal system in rigid position against the steel ball 18 as described above. The term rigid is relative as used herein, since the elastic properties of the steel ball allows for slight yielding of the system after the normal grinding forces have taken up possible looseness and springiness in the rest of the system.

Figure 8:
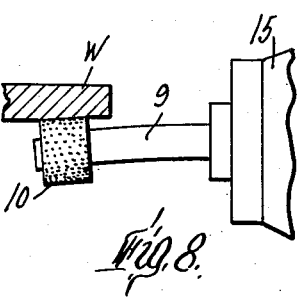
Fig. 8 is a diagrammatic view of a grinding tool in operation.

In an internal grinder, with the inherent projecting tool spindle in lesser or greater degree is always present the condition of spindle deflection which is shown exaggerated in Fig. 8. From this, it will be seen that a given transverse movement between tool and work does not necessarily equal an amount of stock removal commensurate with said movement. To remedy this condition, a dwell has heretofore been used, during which time the tool and work were kept in contact without further relative transverse movement. Such a solution, however, was not satisfactory in the case of modern automatic machine working to close tolerances and at high cycling speed because it did not take in consideration such variables as normally occur during the run of a job, even during one single cycle as, for example, variation in hardness of the work and occasional erratic cutting characteristics of the tool.

Instead of relying on a predeterminedly timed dwell, this invention uses the actual magnitude of the spindle deflection (which is directly related to the grinding pressure) as a measure to establish when and where the grinding operation should be terminated. Thus, the stops 100 and 101 herein have the function of arresting the transverse feed movement at a position slightly before the expected size is reached and are so adjusted. The grinding then continues with the work in contact with the grinding wheel as long as the spindle is deflected.

More specifically, stops 100 and 101 act as mechanical stops for arresting the transverse feeding movement of carriage 2 and further act to open a normally closed switch 25 and de-energize the solenoid. The spring force of ball 18 then tends to turn the tool spindle system about the pivot 13 and, as the wheel is thereby forced towards the work, stock removal still proceeds because spindle 9 will progressively straighten. The system is permitted to swing to a predetermined position, at which a change is affected in the characteristics of the strain gage circuit. That is, a predetermined value of the strain gage resistance commensurate with a certain position of the pivoted system is then utilized to initiate several cycle controlling functions by actuating, for example, a sensitive relay 26. When said relay is actuated, one contact 27 thereof energizes the solenoid and again puts the steel ball 18 under pre-load. Another contact 28 actuates the feed mechanism controller 30 with the effect that the same now returns to its backed off or start position, and in the same time, the tool carriage is moved out of the grinding zone, and the machine is conditioned for the next phase of its cycle in a way generally known and particularly described in U. S. Patent No. 2,429,830.

It will be appreciated by those skilled in this art that, in its broader aspects, the invention is not limited to the specific mechanism or application herein described, but that various modifications are possible within the spirit of the invention and the scope of the appended claims.

I claim:

1. In a grinding machine, workpiece supporting means including a headstock and spindle means rotatably mounted therein for rotatively supporting a workpiece on which a surface of revolution is to be generated, carriage means movable relatively to said workpiece supporting means, grinding tool supporting means including a spindle for supporting a grinding tool in peripheral engagement with said surface of revolution to grind said surface, said grinding tool supporting means being pivotally mounted on said carriage for movement about an axis generally perpendicular to the axis of said grinding tool supporting spindle, resilient preloaded ball means interposed between said grinding tool supporting means and said carriage means at a point remote from said grinding tool spindle axis and said supporting means pivot axis, means including spring means for preloading said resilient means to an initial predetermined pressure and means responsive to the degree of deformation of said resilient means from pressure contact of said grinding tool and said workpiece adapted to control the grinding cycle of said machine.

2. A grinding machine as claimed in claim 1 including means operable to remove said initial pressure.

3. A grinding machine as claimed in claim 2 wherein said spring means is arranged to displace said tool spindle axis away from a normal position, and said ball means is arranged to restore the tool spindle axis toward said normal position.

4. A grinding machine as claimed in claim 2 wherein said means for removing said initial pressure includes switch means actuated at a predetermined point in the relative transverse movement of said workpiece supporting means and said carriage means to de-energize said solenoid means.

5. A grinding machine as claimed in claim 3 wherein said means responsive to the degree of deformation of said resilient means is indicative of a predetermined termination position of said restorative movement toward said normal position.

6. A grinding machine as claimed in claim 1 wherein said means responsive to the degree of deformation of said resilient means includes an electrical strain gage interposed between said supporting means and said carriage.

References Cited in the file of this patent

UNITED STATES PATENTS

| 2,023,662 | Blood | Dec. 10, 1935 |
| 2,429,830 | Ljunggren | Oct. 28, 1947 |
| 2,585,533 | Bryant et al. | Feb. 12, 1952 |
| 2,612,008 | Kuniholm et al. | Sept. 30, 1952 |
| 2,647,348 | Hahn | Aug. 4, 1953 |
| 2,680,941 | Hahn | June 15, 1954 |

FOREIGN PATENTS

| 633,066 | Great Britain | Dec. 12, 1949 |